United States Patent [19]

Suzuki

[11] 3,722,368

[45] Mar. 27, 1973

[54] FLUID POWER STEERING UNIT
[75] Inventor: Hideki Suzuki, Anjo, Japan
[73] Assignee: Aisin Seiki Kabushiki Kaisha, Aichi Pref., Japan
[22] Filed: June 1, 1971
[21] Appl. No.: 148,536

[30] Foreign Application Priority Data

June 4, 1970   Japan .......................... 45/55030

[52] U.S. Cl. ............................... 91/375 R, 91/422
[51] Int. Cl. ................................................ F15b 9/10
[58] Field of Search ......... 91/375 A, 375 R, 422, 380

[56] References Cited

UNITED STATES PATENTS

| | | | |
|---|---|---|---|
| 3,010,335 | 11/1961 | Foerster et al. | 91/380 |
| 3,033,051 | 5/1962 | Reinke et al. | 91/375 A |
| 3,162,263 | 12/1964 | Brown, Jr. | 91/375 A |
| 3,508,467 | 4/1970 | Falkerts | 91/375 A |
| 3,602,101 | 8/1971 | Jablonsky et al. | 91/422 |

FOREIGN PATENTS OR APPLICATIONS 1,332,115   6/1963   France ................................. 91/375

Primary Examiner—Paul E. Maslousky
Attorney—Pierce, Scheffler & Parker

[57] ABSTRACT

An integral power steering apparatus for the vehicle in which a fluid power piston meshing with a gear sector mechanically connected to the pitman arm accommodates a rotary valve member therewithin which will be actuated to rotate by rotation of a manual steering shaft for controlling the hydraulic pressure supply to assist the piston advancement, whereby a compact and effective power steering unit may be obtained.

6 Claims, 3 Drawing Figures

FIG. 2
FIG. 3
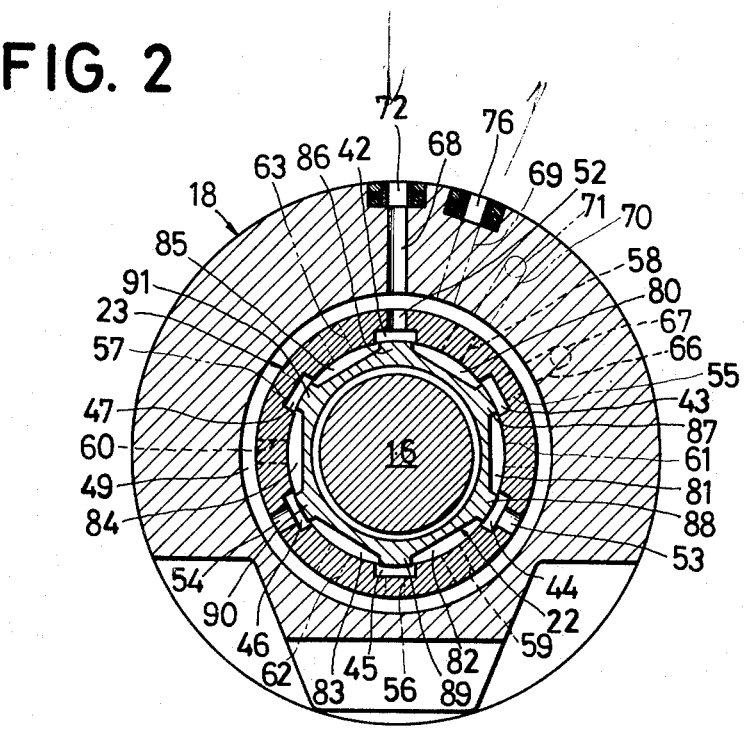
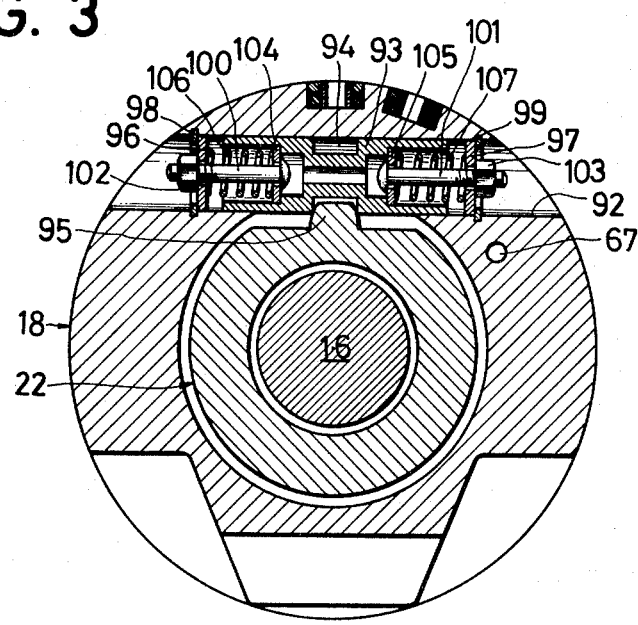

FLUID POWER STEERING UNIT

BACKGROUND OF THE INVENTION

This invention relates to a power steering apparatus, and more particularly to a fluid power steering apparatus for the vehicle of the so-called "integral" type in which the fluid assisted power mechanism is in effect built into the gear housing.

The integral power steering apparatus is advantageous especially for the reasons of the greater convenience at assembly and of the simple arrangement of the fluid piping when the power steering apparatus is installed as original equipment on the vehicle as is generally the case.

In spite of the above advantages, difficulties of the integral power steering unit have been encountered in associating with the very limited space available in the engine compartment of the automotive vehicle, since it requires a bulkier structure than the "linkage" type power steering unit in which the fluid assisted power mechanism is arranged separately from the gear housing, the said linkage power steering unit being objected to as too complicated at assembly and too difficult of the piping arrangement. In order to overcome the above drawbacks, various improved integral power steering apparatus have been presented one of which accommodates an axially movable spool valve within the power piston, said spool valve controlling the fluid supply to the fluid chamber in order to assist the piston movement.

However, since the conventional spool valve has been arranged to be shiftable in its axial direction by rotational movement of the steering shaft, a problem has arisen in that it is necessary to convert the rotational movement of the steering shaft into the axial movement of the control valve member. This requires still much complicated structure of the unit and results in unsatisfactory response thereof.

SUMMARY OF THE INVENTION

Therefore, an object of this invention is to provide an integral power steering unit which occupies substantially no more space than the integral power steering unit heretofore proposed.

Another object of this invention is to provide an integral power steering unit in which a rotary control valve is housed within a cylindrical piston to be actuated by rotation of the steering shaft.

A further object of this invention is to provide an integral power steering unit which is of a greater ease of manufacture with increased accuracy.

The other objects and features, and the novel details of construction of one commercially practical embodiment of the invention will become more apparent as this description proceeds, especially when considered in connection with the accompanying drawings.

BRIEF EXPLANATION OF THE DRAWINGS

In the drawings:

FIG. 2 is a section taken on the line II—II of FIG. 1 and viewed in the direction of the arrows; and FIG. 3 is a section taken on the line III—III of FIG. 1 and viewed in the direction of the arrows.

DETAILED DESCRIPTION

Figure 1:
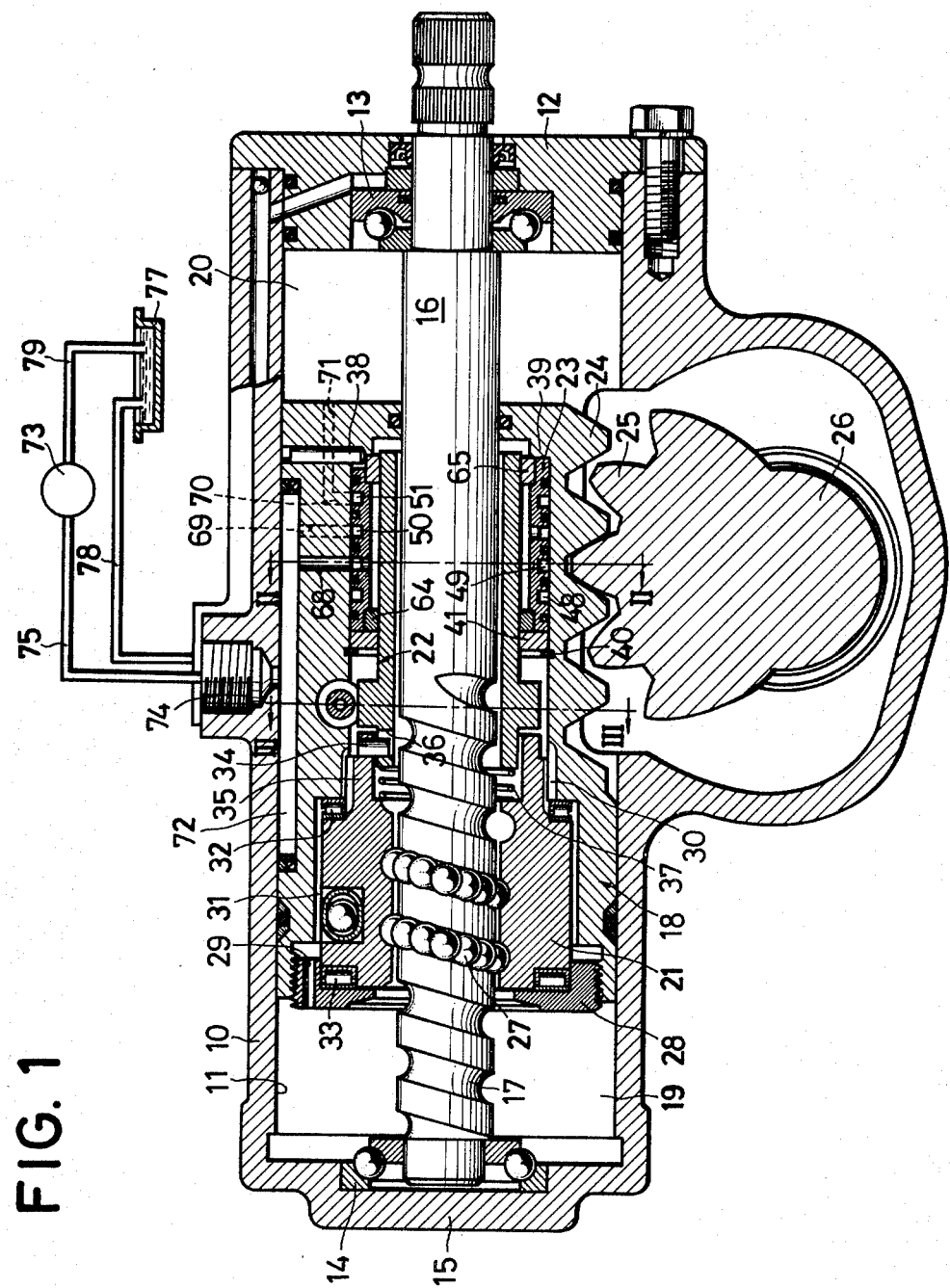
FIG. 1 is a section view of the fluid power steering unit according to the invention taken through the center thereof and illustrating the components of the unit as they are in neutral position. Hydraulic piping connection to the fluid pressure source and the reservoir are shown schematically.

Referring first to FIG. 1, the numeral 10 denotes a gear housing having an inner bore 11, which, on installation of the unit, is fixed to the vehicle frame. The housing is closed at its right end by a closure plug 12 provided with a first ball bearing assembly 13, a second ball bearing assembly 14 being provided at a bottom end 15 of the housing 10. A steering shaft 16 partially provided with a worm 17 thereon, therefore, is supported and permitted to rotate freely in the housing 10 by the ball bearing assemblies 13 and 14. Within the bore 11 of the housing 10, there is slidingly and sealing fitted a hollow cylindrical piston 18 which will divide the bore 11 into two fluid chambers 19 and 20 and accomodate a ball nut 21 hereinafter call nut, and annular inner and outer valve members 22 and 23 therewithin coaxially of the steering shaft 16. The piston 18 is provided with rack teeth 24 meshing with a gear sector 25 integral with a cross shaft 26 which extends into the bore 11 and is mechanically connected to a conventional pitman arm (not shown). The nut 21 is internally grooved to seat balls 27 providing the connection between it and the worm 17 of the steering shaft 16. The axial withdrawal of the nut 21 from the interior of the piston 18 is limited by an adjuster nut 28 which is externally threaded to engage the piston 18 and is provided with a fluid passage 29 opened to the left fluid chamber 19, but the nut 21 is permitted to rotate within predetermined limits relative to the piston 18 in spite of a spline connection therebetween indicated by the numeral 30. An annular gap 31 is provided between the outer periphery of the nut 21 and the inner cylindrical periphery of the piston 18. Bearings 32 and 33 are preferably interposed between the piston 18 and the nut 21 and between the adjuster nut 28 and the nut 21, respectively, for decreasing the rotational resistance of the nut 21. A pin 34 studded in a sleeve 35 of the nut 21 is received in an elongated slot 36 of the inner valve member 22 which is biased to the right in FIG. 1 by a coil spring 37 mounted between it and the nut 21 thereby permitting the inner valve member 22 to rotate in unison with the nut 21.

The outer valve member 23 is prevented both from its rotation relative to the piston 18 by a pin 38 studded therein and from its axial movement relative to the piston 18 by an internal shoulder 39 of the piston 18 and a snap ring 40 fixed to the piston 18 and a spacer 41 interposed between the snap ring 40 and the edge of the outer valve member 23. In FIG. 2, the outer valve member 23 is at its inner cylindrical surface axially grooved at circumferentially equal distances as indicated by the numerals 42 to 47, while it is at its outer peripheral surface radially grooved at axial distances as indicated by the numerals 48 to 51. The axial grooves 42, 44, and 46 of the outer valve member 23 communicated with the radial groove 49 by through holes 52, 53, and 54 provided in the outer valve member 23 at circumferentially equal distances, respectively, whilst the axial grooves 43, 45, and 47 communicate with the radial groove 50 by through holes 55, 56, and 57 at circumferentially equal distances, respectively. The outer valve member 23 is provided with through holes 58 to 60 at circumferentially equal distances to communicate with the annular grooves 48 of the outer valve member 23, the holes 58 to 60 being positioned between the axial grooves 42 and 43 of the outer valve member 23, between the axial grooves 44 and 45 thereof, and between the axial grooves 46 and 47, respectively. The outer valve member 23 is further provided with through holes 61 to 63 at circumferentially equal distances to communicate with the annular groove 51 of the outer valve member 23, the holes 61 to 63 being positioned between the axial grooves 43 and 44, between the axial grooves 45 and 46, and between the axial grooves 47 and 42, respectively. Each end of the axial grooves 42 to 47 in the outer valve member 23 is closed by rings 64 and 65 securely fitted thereto.

The piston 18 is provided with a first radial hole 66 fluidically communicating with the annular groove 48, an axial passage 67 fluidically communicating both with the first hole 66 and with the annular gap 31, a second radial hole 68 fluidically communicating with the annular groove 49, a third radial hole 69 fluidically communicating with the annular groove 50, a fourth radial hole 70 fluidically communicating with the annular groove 51, an axial passage 71 fluidically communicating with the fourth hole 70 and with the right fluid chamber 20. An axial hollow 72 is formed in the outer peripheral surface of the piston 18 to communicate fluidically both with the second radial hole 68 of the piston 18 and with a pump 73 through an inlet port 74 of the housing 10 and an inlet conduit 75, while another axial hollow 76 (see FIG. 2) is formed therein at a distance from the axial hollow 72 to communicate fluidically with the third radial hole 69 of the piston 18 and with a fluid reservoir 77 through an outlet port (not shown) of the housing 10 and an outlet conduit 78, the said reservoir 77 also fluidically communicating with the pump 73 through a fluid conduit 79.

The inner valve member 22 of substantially cylindrical shape is axially grooved as indicated by the numerals 80 to 85 (FIG. 2). Ridges 86 to 91 of the inner valve 22 are arranged at circumferentially equal distances and are sealingly slidable on the inner cylindrical surface of the outer valve member 23 thereby permitting the axial grooves 80 to 85 therein to face selectively the through holes of the outer valve member 23.

In FIG. 3, within a chordal bore 92 formed in the piston 18 there is slidably fitted a cylindrical spool 93 provided at its intermediate portion with an annular groove 94 in which a radial projection 95 of the inner valve member 22 is received. The cylindrical spool 93 is prevented from its axial withdrawal by spacers 96 and 97 and snap rings 98 and 99 fixed to the piston 18. Bolts 100 and 101 are fixed to the spacers 96 and 97 by nuts 102 and 103, respectively, at their outer ends, while being loosely supported by washers 104 and 105, respectively, at their inner ends, each of the washers 104 and 105 contacting the inner walls of the cylindrical spool 93. A coil spring 106 is mounted between the spacer 96 and the washer 104 while a coil spring 107 is mounted between the spacer 97 and the washer 105, thus permitting the inner valve member 22 to occupy its neutral position as clearly shown in FIGS. 2 and 3 when no force is applied on the steering shaft 16.

In operation, when no force is applied on the steering shaft 16, the inner valve member 22 is set in its neutral position so that the six axial grooves 80 to 85 in the inner valve member 22 will communicate with all of the axial grooves 42 to 47 in the outer valve member 23. Thus, the fluid under pressure from the pump 73 flows to the axial grooves 80 to 85 in the inner valve member 22 through the inlet conduit 75, the inlet port 74 of the housing 10, the axial hollow 72 in the piston 18, the second radial hole 68 in the piston 18, the annular groove 49 in the outer valve member 23, the through holes 52 to 54, and the axial grooves 42, 44, and 46 therein. The fluid supplied to the axial grooves 80 to 85 in the inner valve member 22 will then flow to the left fluid chamber 19, to the right fluid chamber 20, and to the reservoir 77, respectively, thereby causing no pressure difference between the fluid chambers 19 and 20 and hence no axial movement of the piston 18 due to the hydraulic pressure. More specifically, the fluid in the axial grooves 80, 82, and 84 in the inner valve member 22 flows to the left fluid chamber 19 through the through holes 58 to 60 in the outer valve member 23, the annular groove 48 therein, the first hole 66 in the piston 18, the passage 67 thereof, the annular gap 31 between the nut 21 and the piston 18, and the passageway 29 in the adjuster nut 28; the fluid in the axial grooves 81, 83, and 85 in the inner valve member 22 flows to the right fluid chamber 20 through the through holes 61 to 63 in the outer valve member 23, the annular groove 51 therein, the fourth hole 70 in the piston 18, and the axial passage 71 therein; the fluid in the axial grooves 80 to 85 in the inner valve member 22 flows to the reservoir 77 through the through holes 56 to 57 in the outer valve member 23, the annular groove 50 therein, the third hole 69 in the piston 18, the axial hollow 76 therein, the outlet port (not shown) of the housing 10, and the outlet conduit 78.

When the steering shaft 16 is rotated in a certain direction, for example in the counterclockwise direction, the nut 21 is urged to rotate in the same direction through the balls 27 provided between it and the worm 17 since there exists a large friction on the pitman arm (not shown) and hence on the cross shaft 26 and the rack teeth 24 on the piston 18 engages the cross shaft 26 thereby preventing the axial movement of the piston 18. Therefore, the inner valve member 22 fixed to the nut 21 by the pin 34 is also rotated in the same direction against the exerting force of the spring 106 so that each of the axial grooves 80, 82, and 84 in the inner valve member 22 is fluidically communicated both with the pump 73 and with the left fluid chamber 19 whilst each of the axial grooves 81, 83, and 85 therein is fluidically communicated both with the reservoir 77 and with the right fluid chamber 20. As a result, the piston 18 will be urged to move in the right direction in FIG. 1 due to the hydraulic pressure difference between the both chambers 19 and 20 thereby causing the clockwise rotation of the cross shaft 26. It will be seen that the inner valve member 22 is kept in its rotationally shifted position as long as the steering shaft 16 is being rotated.

When the rotational operation of the steering shaft 16 is halted, the inner valve member 22 is returned to its neutral position by the spring 106 thereby interrupting the pressurized fluid supply to the left fluid chamber 19. Thus, a further advancement of the piston 18 will be limited. When the steering shaft 16 is rotated in the clockwise direction, the pressurized fluid will be supplied to the right fluid chamber 20 thereby causing the axial movement of the piston 18 in the left direction in FIG. 1, but the detailed explanation in this case may be omitted since it would be apparent to those skilled in the art.

It should be noted that upon hydraulic failure of the unit the spline connection 30 between the nut 21 and the piston 18 can effect the endwise movement of the piston 18 thereby permitting the manual operation of the unit.

I claim:

1. A fluid power steering unit comprising a gear housing, a supply pipe to said housing, a discharge pipe from said housing, a cross shaft extending within said housing and formed with a gear sector, a manually operable steering shaft extending within said housing, a hollow cylindrical piston slidably fitted within said housing and delineating a pair of opposed fluid chambers therewithin, said piston being provided with rack teeth meshing with said gear sector of said cross shaft, a ball nut housed within said piston coaxially of said steering shaft and mechanically connected thereto, an annular outer valve member rigidly mounted in said piston, said outer valve member being provided with a first annular groove normally fluidically communicating with one of said fluid chambers, a second annular groove normally fluidically communicating with the supply pipe, a third annular groove normally fluidically communicating with the discharge pipe, and a fourth annular groove normally fluidically communicating with the other fluid chamber, said outer valve member being provided with passage communicating with said annular grooves, an annular inner valve member housed within said piston coaxially of and spaced from said steering shaft and connected to said ball nut and rotatable therewith, said inner valve member being rotatable around said steering shaft by said nut thereby cooperating with said outer valve member for selective communication with said passages by rotation of said steering shaft, and means having a pair of return springs for normally urging said inner valve member to its neutral position in which no hydraulic pressure difference is generated between said fluid chambers.

2. A fluid power steering unit as claimed in claim 1 wherein said piston is provided with a chordal bore and said inner valve member is provided with a radial projection projecting into said chordal bore, and wherein said pair of return springs are mounted in said chordal bore on each side of said projection.

3. A fluid power steering unit as claimed in claim 1 wherein said inner valve member is provided with a slot and said ball nut is provided with a pin cooperating with said slot to rotate said inner valve member when said ball nut is rotated.

4. A fluid power steering unit of claim 1 wherein said inner valve member is provided with ridge means arranged at circumferentially equal distances to cooperate with axial groove means of said outer valve member.

5. A fluid power steering unit of claim 1 wherein said nut is externally splined to engage said piston and permitted to rotate within predetermined limits by said steering shaft.

6. A fluid power steering unit of claim 1 wherein an open end of said piston is closed by an externally threaded adjuster nut which serves to prevent the axial withdrawal of said nut.

* * * * *